United States Patent
Cornic et al.

(10) Patent No.: US 12,436,269 B2
(45) Date of Patent: Oct. 7, 2025

(54) RADAR IMAGING METHOD, AND RADAR USING SUCH A METHOD

(71) Applicant: THALES, Courbevoie (FR)

(72) Inventors: Pascal Cornic, Brest (FR); Renan Le Gall, Brest (FR); Yves Audic, Brest (FR)

(73) Assignee: THALES, Courbevoie (FR)

(*) Notice: Subject to any disclaimer, the term of this patent is extended or adjusted under 35 U.S.C. 154(b) by 437 days.

(21) Appl. No.: 17/920,718

(22) PCT Filed: Apr. 16, 2021

(86) PCT No.: PCT/EP2021/059875
§ 371 (c)(1),
(2) Date: Oct. 21, 2022

(87) PCT Pub. No.: WO2021/219398
PCT Pub. Date: Nov. 4, 2021

(65) Prior Publication Data
US 2023/0194698 A1    Jun. 22, 2023

(30) Foreign Application Priority Data

Apr. 29, 2020  (FR) ...................................... 2004262

(51) Int. Cl.
*G01S 13/89* (2006.01)
*G01S 7/35* (2006.01)
*G01S 13/58* (2006.01)

(52) U.S. Cl.
CPC .............. *G01S 13/89* (2013.01); *G01S 7/354* (2013.01); *G01S 7/356* (2021.05); *G01S 13/584* (2013.01)

(58) Field of Classification Search
CPC ........... G01S 13/426; G01S 2013/0245; G01S 2013/0254; G01S 2013/22;
(Continued)

(56) References Cited

U.S. PATENT DOCUMENTS 3,680,100 A * 7/1972 Woerrlein ............ H01Q 3/2605
                                                                342/146
4,996,532 A * 2/1991 Kirimoto .................. G01S 7/36
                                                                 342/17
(Continued)

FOREIGN PATENT DOCUMENTS

| EP | 2 293 101 A1 | 3/2011 | |
| RU | 2255352 C2 * | 6/2005 | ........... G01S 13/931 |
| WO | 2021/058674 A1 | 4/2021 | |

OTHER PUBLICATIONS

Zhu, et al., "Fast coherent integration method for moving target detection with random PRI variation", Electronics Letters, vol. 56, Issue 1, pp. 41-43, Jan. 2020.

*Primary Examiner* — Michael W Justice
(74) *Attorney, Agent, or Firm* — BakerHostetler (57) ABSTRACT

An imaging method using a doppler radar wherein the pointing direction in transmission ($d_{ei}$) is modified from recurrence to recurrence; each detection block of duration T comprises a periodic repetition of a number C of pointing cycles, each of these cycles comprising a number P of recurrences, the set of these P recurrences covering the $D_e$ pointing directions ($d_{ei}$) of the set; the order of the pointings is modified in a pseudo-random manner from pointing cycle to pointing cycle during a same detection block so as to create an irregular time interval between two pointings in a same direction; at least one beam is formed in reception on each recurrence in a direction included in the transmission-focused angular domain in the pointing direction corresponding to the recurrence.

16 Claims, 8 Drawing Sheets

(58) Field of Classification Search
CPC ...... G01S 2013/5244; G01S 7/36; G01S 7/38;
G01S 7/537; G01S 7/021; H01Q 3/26;
H04K 3/90
USPC .................. 342/157, 81, 158, 137, 108, 159
See application file for complete search history.

(56) References Cited

U.S. PATENT DOCUMENTS

| | | | | |
|---|---|---|---|---|
| 5,793,798 | A * | 8/1998 | Rudish | H01Q 3/30 375/138 |
| 5,943,132 | A * | 8/1999 | Erskine | G01S 7/352 356/484 |
| 6,163,564 | A * | 12/2000 | Rudish | G01S 13/325 370/204 |
| 6,608,588 | B2 * | 8/2003 | Elam | G01S 13/288 342/189 |
| 6,750,804 | B2 * | 6/2004 | Chen | G01S 13/5244 342/134 |
| 6,833,809 | B2 * | 12/2004 | Elam | G01S 13/288 342/178 |
| 7,132,975 | B2 * | 11/2006 | Fullerton | G01S 13/0209 342/107 |
| 7,333,047 | B2 * | 2/2008 | Fullerton | G01S 13/72 342/28 |
| 7,664,533 | B2 * | 2/2010 | Logothetis | H01Q 1/246 342/368 |
| 8,013,778 | B2 * | 9/2011 | Grafmueller | G01S 13/904 342/25 R |
| 8,134,495 | B2 * | 3/2012 | Ookawa | G01S 7/484 342/159 |
| 8,565,193 | B2 * | 10/2013 | Ylitalo | H04B 7/0617 370/252 |
| 9,292,792 | B1 * | 3/2016 | Pedersen | G06F 18/24155 |
| 9,442,182 | B2 * | 9/2016 | Morita | G01S 7/2813 |
| 9,600,765 | B1 * | 3/2017 | Pedersen | F41H 11/00 |
| 9,766,324 | B2 * | 9/2017 | Katz | H01Q 1/245 |
| 9,915,731 | B2 * | 3/2018 | Amano | G01S 7/0236 |
| 9,952,320 | B2 * | 4/2018 | Ossowska | G01S 13/931 |
| 10,054,679 | B2 * | 8/2018 | Shibata | G01S 13/426 |
| 10,222,453 | B2 * | 3/2019 | Yomo | G01S 13/867 |
| 10,362,493 | B2 * | 7/2019 | Burgess | H04L 1/0027 |
| 10,386,470 | B2 * | 8/2019 | Zivkovic | G01S 13/931 |
| 10,422,870 | B2 * | 9/2019 | Mindell | G01B 11/14 |
| 10,684,354 | B2 * | 6/2020 | Brune | G01S 7/2813 |
| 10,728,896 | B2 * | 7/2020 | DiGregory, Jr. | H04W 72/0453 |
| 10,795,014 | B2 * | 10/2020 | Shan | G01S 13/931 |
| 10,908,272 | B2 * | 2/2021 | Rao | G01S 13/34 |
| 11,163,037 | B2 * | 11/2021 | Bily | G01S 13/04 |
| 11,428,805 | B2 * | 8/2022 | Kishigami | G01S 13/42 |
| 11,450,957 | B2 * | 9/2022 | Sakuma | H04W 16/28 |
| 11,483,041 | B2 * | 10/2022 | Alidio | H01P 1/18 |
| 11,520,003 | B2 * | 12/2022 | Stettiner | G01S 7/0232 |
| 11,802,954 | B2 * | 10/2023 | Anno | G01S 13/584 |
| 2002/0021240 | A1 * | 2/2002 | Elam | G01S 13/003 342/162 |
| 2003/0189512 | A1 * | 10/2003 | Chen | G01S 13/5244 342/107 |
| 2004/0196178 | A1 * | 10/2004 | Elam | G01S 13/288 342/202 |
| 2005/0264438 | A1 * | 12/2005 | Fullerton | G01S 13/72 342/28 |
| 2006/0238411 | A1 * | 10/2006 | Fullerton | G01S 13/72 342/147 |
| 2009/0079621 | A1 * | 3/2009 | Grafmueller | G01S 13/904 342/25 A |
| 2010/0214159 | A1 * | 8/2010 | Ookawa | G01S 7/038 342/202 |
| 2010/0321231 | A1 * | 12/2010 | Nakahama | G01S 7/062 342/159 |
| 2011/0255434 | A1 * | 10/2011 | Ylitalo | H04B 7/0617 370/252 |
| 2011/0295549 | A1 * | 12/2011 | Takabayashi | G01S 13/86 702/142 |
| 2015/0070207 | A1 * | 3/2015 | Millar | G01S 13/4454 342/174 |
| 2015/0168540 | A1 * | 6/2015 | Morita | G01S 13/0209 342/21 |
| 2015/0301172 | A1 * | 10/2015 | Ossowska | G01S 13/878 342/70 |
| 2016/0025853 | A1 * | 1/2016 | Amano | G01S 7/0235 342/371 |
| 2016/0187479 | A1 * | 6/2016 | Shibata | G01S 13/325 342/59 |
| 2016/0327634 | A1 * | 11/2016 | Katz | H04B 1/3838 |
| 2016/0349354 | A1 * | 12/2016 | Yomo | G01S 13/931 |
| 2017/0181010 | A1 * | 6/2017 | Burgess | H04W 72/12 |
| 2017/0248692 | A1 * | 8/2017 | Zivkovic | G01S 7/352 |
| 2018/0156891 | A1 * | 6/2018 | Brune | G01S 7/2813 |
| 2018/0231652 | A1 * | 8/2018 | Rao | G01S 13/9011 |
| 2018/0239010 | A1 * | 8/2018 | Mindell | G01S 13/34 |
| 2018/0372837 | A1 * | 12/2018 | Bily | G01S 7/032 |
| 2019/0064338 | A1 * | 2/2019 | Holt | H01Q 1/525 |
| 2019/0200356 | A1 * | 6/2019 | DiGregory, Jr. | H04K 3/25 |
| 2019/0219685 | A1 * | 7/2019 | Shan | G01S 13/89 |
| 2019/0235050 | A1 * | 8/2019 | Maligeorgos | G01S 7/032 |
| 2019/0361109 | A1 * | 11/2019 | Mindell | G01S 11/02 |
| 2019/0383898 | A1 * | 12/2019 | Alidio | G01S 13/865 |
| 2020/0393536 | A1 * | 12/2020 | Stettiner | G01S 13/343 |
| 2020/0393553 | A1 * | 12/2020 | Kishigami | G01S 7/036 |
| 2021/0247509 | A1 * | 8/2021 | Anno | G01S 13/584 |
| 2021/0344113 | A1 * | 11/2021 | Sakuma | H04W 16/28 |
| 2022/0390592 | A1 * | 12/2022 | Cornic | G01S 13/933 |

* cited by examiner

RADAR IMAGING METHOD, AND RADAR USING SUCH A METHOD

CROSS-REFERENCE TO RELATED APPLICATIONS

This application is a National Stage of International patent application PCT/EP2021/059875, filed on Apr. 16, 2021, which claims priority to foreign French patent application No. FR 2004262, filed on Apr. 29, 2020, the disclosures of which are incorporated by reference in their entirety.

FIELD OF THE INVENTION

The invention relates to the field of active antenna radars, and notably radars intended to cover a wide angular segment with a high discrimination, within a limited time. The invention relates for example to the imaging doppler radars intended to cover a field in view in front of a vehicle when the latter is moving at high speed.

BACKGROUND

In the applications targeted, the aim is to produce an image of a given scene, corresponding to a given angular segment, using multiple relatively fine antenna beams making it possible to angularly separate the different objects present in the field of view of the radar.

The invention can be implemented by a radar installed on a fixed structure or on a moving structure. The fields of application of the invention are notably as follows:
  use in landing for EVS (Enhanced Vision System) airplanes;
  obstacle avoidance radars for piloted or unmanned aircraft;
  anticollision radars for vehicles on the ground, motor vehicles, rail convoys, terrestrial drones for example.

One issue to be dealt with is how to present a quasi-instantaneous image with high angular resolution of the scene present in all of the field of view of a radar, while limiting the digital processing requirements necessary to ensure this function. This capacity is particularly advantageous on a carrier moving rapidly with respect to the scene to be observed, or when the scene itself is rapidly changing, or even when both of these conditions are simultaneously met.

To produce a simultaneous image of all of an observed scene, it is necessary, in a scanning-based angular sweep radar, to temporally realign the detections obtained in the different successive targeted directions. Such realignments can be complex to implement and entail recourse to an inertial unit when there are spurious movements of the carrier of the radar to compensate for these movements. Even after such compensations, conformity defects may persist because of the non-stationary nature of the scene during the time necessary for the observation.

One aim of the patent application FR1910613 is to address this issue. More particularly, the issue covered by the patent application FR1910613 is to present a quasi-instantaneous image with high angular resolution of the scene present in all of the field of view of a radar, while limiting the digital processing requirements necessary to ensure this function. This capacity is particularly advantageous on a carrier which is moving rapidly with respect to the scene to be observed, or when the scene itself is changing rapidly, or even when both of these conditions are simultaneously met.

The solution proposed in the patent FR1910613 to resolve this technical problem relies on an active antenna radar, in which the transmission antenna is focused in a different direction from pulse to pulse and at least one reception beam is formed in the transmission-focusing direction for each pulse transmitted.

However, there is a need to process not only the creation of a quasi-instantaneous image with high angular resolution of the scene present in all of the field of view of a radar, but also to process the estimation of the doppler frequencies characterizing the speed of the targets and of the coherent clutter detected on this image. This need relates notably to the doppler radars with speed ambiguity, in particular with a preferential application to an imaging doppler radar covering a field of view in front of a vehicle at high speed.

In this configuration, the constraints imposed on the radar, deriving typically from the instrumented range requirements and the extent of the angular domain to be explored, can necessitate a speed-ambiguous waveform, not only on the moving targets, but also on the fixed targets and clutter.

Moreover, when the spectral occupancy of the echoes received in the doppler domain is significant, typically of the same order of magnitude as the width of the unambiguous doppler domain, the usual techniques for eliminating ambiguity based on the modulation of radar recurrence periods from doppler burst to doppler burst become ineffective. This situation occurs notably when the targets detected are numerous and they occupy a large number of doppler filters. In this case, two or even more targets may be superimposed by spectral aliasing. The same applies when the clutter perceived by the antenna of the radar occupies a doppler band of the same order of magnitude as the width of the unambiguous doppler domain.

This configuration can occur for a radar operating in millimetric waves, because of the high values of the doppler frequency and the corresponding spectral spread.

In this context, one problem to be resolved is notably, based on the principles described in the patent application FR1910613, to propose a radar imaging method that makes it possible to acquire radar signals such that they make it possible to produce a quasi-instantaneous image of the scene present in all of the field of view of the radar, for all the directions targeted, and that is unambiguous in the doppler domain. And that can be done, when the revisit time of the beam in a same direction induces a sampling frequency which is incompatible with an unambiguous measurement by the conventional methods known to the person skilled in the art.

SUMMARY OF THE INVENTION

One aim of the invention is notably to resolve the technical problem explained above. To this end, the subject of the invention is an imaging method using a doppler radar using an active antenna comprising N transmission channels and M reception channels, said antenna covering an angular domain of given solid angle during a detection time unit of duration T, said time unit corresponding to a detection block in which the N transmission channels are focused successively in pointing directions $d_{ei}$ taken from a set $D_e$ of pointing directions, a method in which:
  the pointing direction on transmission $d_{ei}$ is modified from recurrence to recurrence;
  each detection block of duration T comprises a periodic repetition of a number C of pointing cycles, each of these cycles comprising a number P of recurrences, the set of these P recurrences covering the $D_e$ pointing directions ($d_{ei}$) of said set;

the order of the pointings is modified in a pseudo-random manner from pointing cycle to pointing cycle during a same detection block so as to create an irregular time interval between two pointings in a same direction;

at least one beam is formed in reception on each recurrence in a direction included in said transmission-focused angular domain in the pointing direction corresponding to said recurrence.

In reception, a coherent doppler processing is for example performed by applying, in each pointing direction $d_{ei}$ to all the received signals sampled, a correlator in the doppler domain, this correlator being matched to an irregular temporal sampling comb corresponding to the pointing instants on transmission in a same direction.

The field of application of said correlator corresponds for example to the domain of the relative speeds expected between the carrier of said radar and the targets to be detected.

Said correlator is for example used to eliminate the doppler ambiguities.

Said correlator is for example produced by linear filtering in the time domain.

Said correlator is for example produced by digital Fourier transform in the time domain.

Said correlator is for example produced by digital Fourier transform in the frequency domain.

Said correlator is for example used to estimate the relative speed of the clutter and of the fixed echoes in each pointing direction, with no external means for measuring the carrier speed.

The estimation of the speed of the clutter in a given direction is for example obtained by integrating the energy on the distance cells relative to this direction for each doppler cell of said correlator, then searching for the doppler cell in which the total energy is maximum.

Said estimation of the speed of the clutter is for example obtained by excluding the high level spot echoes.

Said correlator is for example used to eliminate, in each pointing direction, the fixed echoes and the clutter for which the direction of arrival is different from the pointing direction.

Said correlator is for example used to estimate the relative speed of the moving targets in each pointing direction.

Said correlator is for example applied piecewise by breaking down the antenna into different quadrants.

In a particular implementation, there is established, for each beam formed in transmission and in reception, a two-dimensional map representing the fixed echoes and clutter received on the distance axes for all transmission and reception pointing values, TX/RX.

Also a subject of the invention is a radar implementing such a method, said radar being for example of the FMCW type.

BRIEF DESCRIPTION OF THE DRAWINGS

Other features and advantages of the invention will become apparent from the following description, given in light of the attached drawings which represent:

FIG. 9b, an expanded view of FIG. 9a;

DETAILED DESCRIPTION

Throughout the following, a radar is considered in which the antenna comprises several distinct channels in transmission and in reception. The transmission and reception channels can share the same antenna array in transmission and in reception, in accordance with an antenna architecture of conventional AESA (Active Electronic Scanned Array) type, or use distinct antenna arrays in transmission and in reception, in accordance with an MIMO (Multiple Input, Multiple Output) antenna architecture. In all cases, each of the antenna channels in transmission is fed by the same reference wave, this wave being coded temporally in phase differently on each of the transmission channels.

Figure 1:
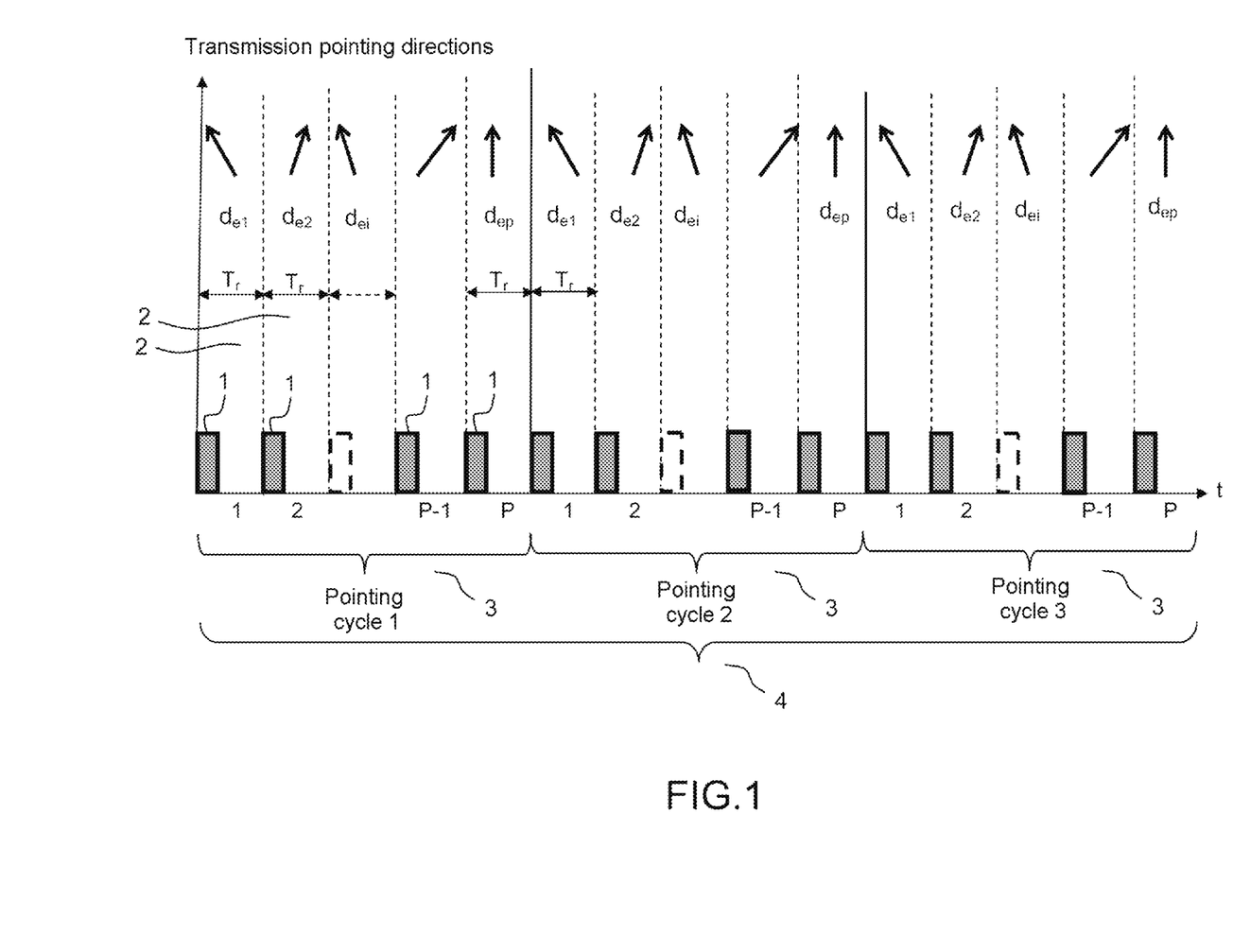
FIG. 1, an illustration of radar transmission according to the prior art.

FIG. 1 illustrates the principle of the solution disclosed in the patent application FR1910613. The latter proposes a solution that makes it possible to obtain, using a radar with MIMO architecture, an instantaneous image of an observation scene by using an electronic scanning technique from pulse to pulse, without knowledge of the speed of the carrier or doppler estimation of the relative radial speed of the targets, or of the clutter.

In this method, each time unit 4, of duration T, corresponds to a burst which comprises a periodic repetition of a number C of identical pointing cycles 3. Each cycle 3 comprises a number P of recurrences 2, the set of these P recurrences covering the $D_e$ pointing directions $d_{ei}$ (i=1 to p). The transmission of the radar is controlled so as to:

radiate successively in the $D_e$ pointing directions $d_{ei}$;

by changing direction from pulse to pulse 1, that is to say from recurrence to recurrence 2;

during a pointing cycle 3 comprising P recurrences of duration Tr, then to repeat the operation according to C successive pointing cycles.

Thus, the revisit time of a same pointing cycle corresponds to the duration of an elementary pointing cycle, that is to say the duration of a recurrence Tr multiplied by the number P necessary to cover the $D_e$ pointing directions $d_{ei}$ as illustrated by FIG. 1. This time is therefore directly proportional to the number $D_e$ of antenna pointings performed in transmission, which induces a revisit frequency of a same target that is all the lower when the number of pointings $D_e$ is high.

Moreover, for each time unit T, according to the methods known to the person skilled in the art, the radar processing performs, on the received signal, on each recurrence, a beam forming in the direction targeted, then a breakdown into Ned distance cells. Then, the processing performs, for each distance cell, a coherent integration of the received signal over the C pointing cycles, corresponding to the doppler processing. The latter processing produces, by digital Fourier transform, a spectral breakdown of the received signal of FFT or DFT type over a number N of doppler filters corresponding to the time horizon T.

It is known to the person skilled in the art that, for a sampling frequency Fech, the doppler frequency Fd becomes ambiguous when:

Fd≥Fech if the signal is complex;
Fd≥Fech/2 if the signal is real.

In the case where the doppler frequency of the targets Fd is much greater than the revisit frequency of a same pointing Fech, the resulting undersampling generates an aliasing of the spectrum with a high order k, k being the integer value of the ratio Fd/Fech.

Thus, for a target of doppler frequency Fd=k·Fech+f, the Fourier transform reveals, by aliasing, in the frequency band lying between 0 and Fech, a line at the frequency f if the signal at the input is complex and two lines at the apparent frequencies f and Fech−f if the signal is real.

In the case where the spectral occupancy of the targets or of the clutter is significant with respect to the width of the unambiguous doppler domain, lying between 0 and Fech if the signal is complex and lying between 0 and Fech/2 if the signal is real, the conventional methods for eliminating ambiguity, based on the use of different revisit frequencies between successive doppler bursts, are inoperative.

One technical problem to be resolved is, in this case, how to accurately and unambiguously estimate the doppler frequencies of the targets and of the clutter, even though these frequencies can be very great, typically 10 to 100 times greater than the revisit frequency of the radar. This problem is notably encountered in the case of an imaging radar operating in millimetric waves, intended to produce an image of the landing runway to an airplane pilot in final approach phase. In this case, the echoes and the fixed clutter may be ambiguous in doppler, so that it is not a priori possible to match a given angular direction to a particular doppler filter.

The solution proposed by the patent application FR1910613 does not make it possible to estimate the doppler frequency of the targets or of the clutter beyond the ambiguity frequency of the radar, corresponding to the sampling frequency Fech in the doppler domain (case of a complex signal), or even to the revisit frequency of a given pointing direction. Moreover, for the high ambiguity ranks, and for a significant occupancy of the doppler spectrum, the method known to the person skilled in the art consisting in modifying the sampling frequency from burst to burst to determine the ambiguity rank k and thus estimate the value of the doppler frequency does not work. In fact, this technique assumes that by successively using, from doppler burst to doppler burst, at least two different sampling frequencies, for a signal of given doppler frequency, the ambiguity rank varies and the aliased frequency line is displaced by a deterministic deviation which makes it possible to measure the doppler frequency unambiguously. It therefore requires at least two successive bursts to establish a detection, which can be reflected by a loss of sensitivity of the radar.

The sampling frequencies are usually chosen first from one another so as to obtain an ambiguity frequency corresponding to the smallest common multiple of these frequencies, according to the known methods. These frequencies are also chosen so that, throughout the speed domain of the targets used, the targets appear at least for one of the sampling frequencies in an exo-clutter zone, that is to say outside of the doppler domain occupied by the clutter and the fixed echoes. The echoes occupy a more or less significant number of doppler filters, as a function in particular of the angular aperture of the antenna of the radar.

Figure 2:
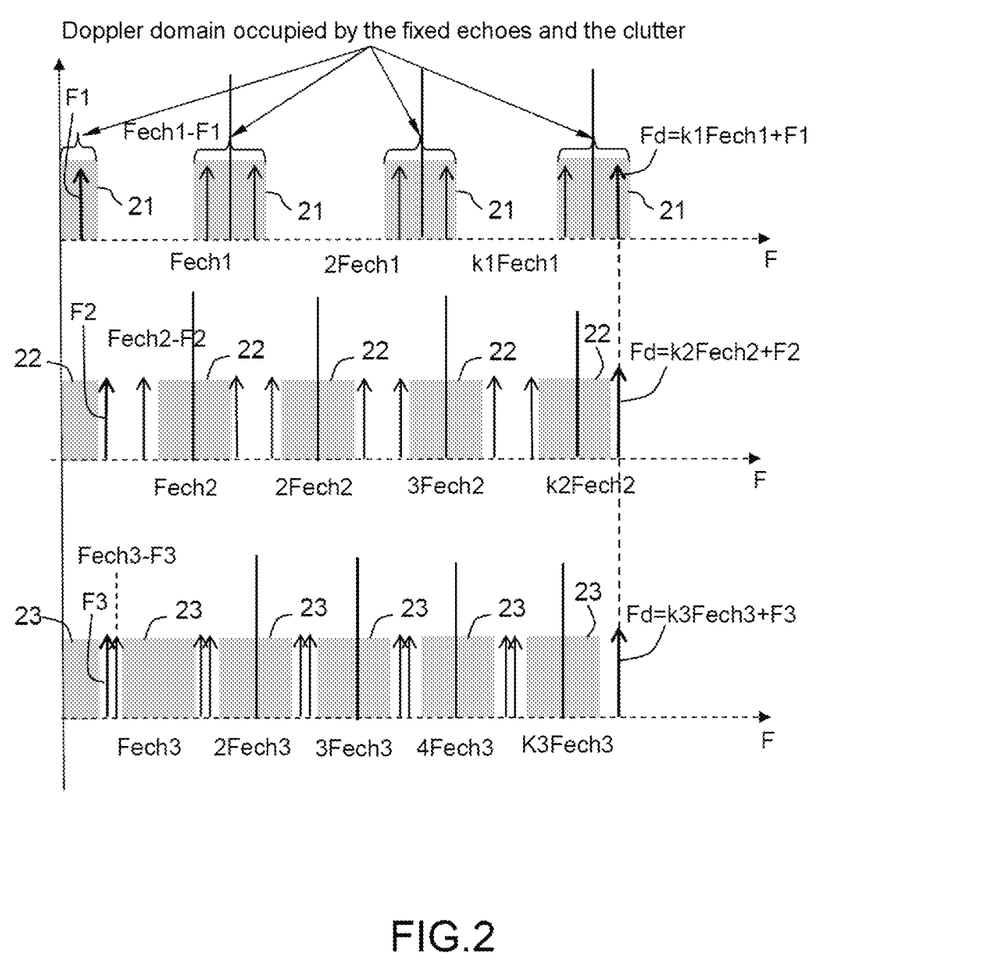
FIG. 2, an illustration of the doppler domain occupied by fixed echoes and clutter.

FIG. 2 illustrates an example with three sampling frequencies, in the case of a mobile carrier where the doppler spectrum may be recentered on the zero frequency using the precise knowledge of the carrier, typically according to the CVA (aircraft speed compensation) technique known to the person skilled in the art.

With these three sampling frequencies Fech 1, Fech 2 and Fech 3, the doppler analysis presents the apparent frequencies F1, F2 and F3 in the first Nyquist zone, corresponding to the aliases respectively of rank k1, k2 and k3 such that, Fd being the doppler frequency of the target:

$$Fd = k1 \cdot Fech1 + F1,$$

$$Fd = k2 \cdot Fech2 + F2;$$

$$Fd = k3 \cdot Fech3 + F3;$$

in which:

$$Fech1 = N1/Tr, Fech2 = N2/Tr \text{ and } Fech3 = N3/Tr;$$

N1, N2 and N3 being integer numbers;
N1 being a prime number;
N1, N2 and N3 being coprime;
with, for example, N2=N1+1 and N3=N2+1.

This situation is illustrated by the example of FIG. 2, in which, starting from the top, the plots successively represent the frequencies associated with the sampling frequencies Fech1, Fech2 and Fech3 according to the above relationships, with the doppler domains 21, 22, 23 occupied by the fixed echoes and the clutter, with CVA. In this example, the target of doppler frequency Fd is visible in the exo-clutter zone, that is to say outside of the domain occupied by the ground echoes, for the sampling frequencies Fech2 and Fech3, but not for Fech1. The measurement of F2 and F3 makes it possible, by known methods, to determine the unambiguous value of Fd corresponding to the relative radial speed between the carrier and the target.

It should be noted that the determination of the radial speed specific to the target corresponding to the doppler frequency Fd is possible only if the speed of movement of the carrier is itself known.

Moreover, when several targets having different relative speeds are present in a same distance resolution cell of the radar, it can become impossible to determine the doppler frequency of each of them by the above processing. In fact, the detections obtained of a same target at the different sampling frequencies cannot then be associated with one another. Furthermore, the doppler frequency band 21, 22, 23 corresponding to the ground clutter and to the fixed echoes can in certain cases occupy most, even all, of the doppler filters. In particular, in the case of an airborne radar irradiating the ground in front of the carrier, the doppler band Bd occupied by the ground clutter is proportional to the aperture angle of the antenna. This doppler band is also inversely proportional to the transmission wavelength of the radar.

Typically, for a radar of wavelength λ whose beam irradiates the ground along the axis of movement of the carrier, for a carrier speed Vp and an antenna aperture at 3 dB equal to $\Delta\theta_{3\,dB}$ expressed in radians, the doppler band Bd (lying between Fdmin and Fdmax) occupied by the fixed echoes and the coherent ground clutter in the axis is:

$$Bd \cong \frac{Vp}{4\lambda}\Delta\theta_{3dB}^2 = |Fdmax - Fdmin|$$

The doppler frequency of the fixed echoes and the coherent clutter is maximal in the axis of movement of the carrier and has the value $$Fdmax = 2\frac{Vp}{\lambda}$$

The doppler frequency of the fixed echoes and of the coherent clutter is minimal at the limits of the aperture of the antenna lobe $\Delta\theta_{3\ dB}$ of the carrier and has the value:

$$Fdmin = 2\frac{Vp}{\lambda}\cos\frac{\Delta\theta_{3dB}}{2}$$

Figure 3:
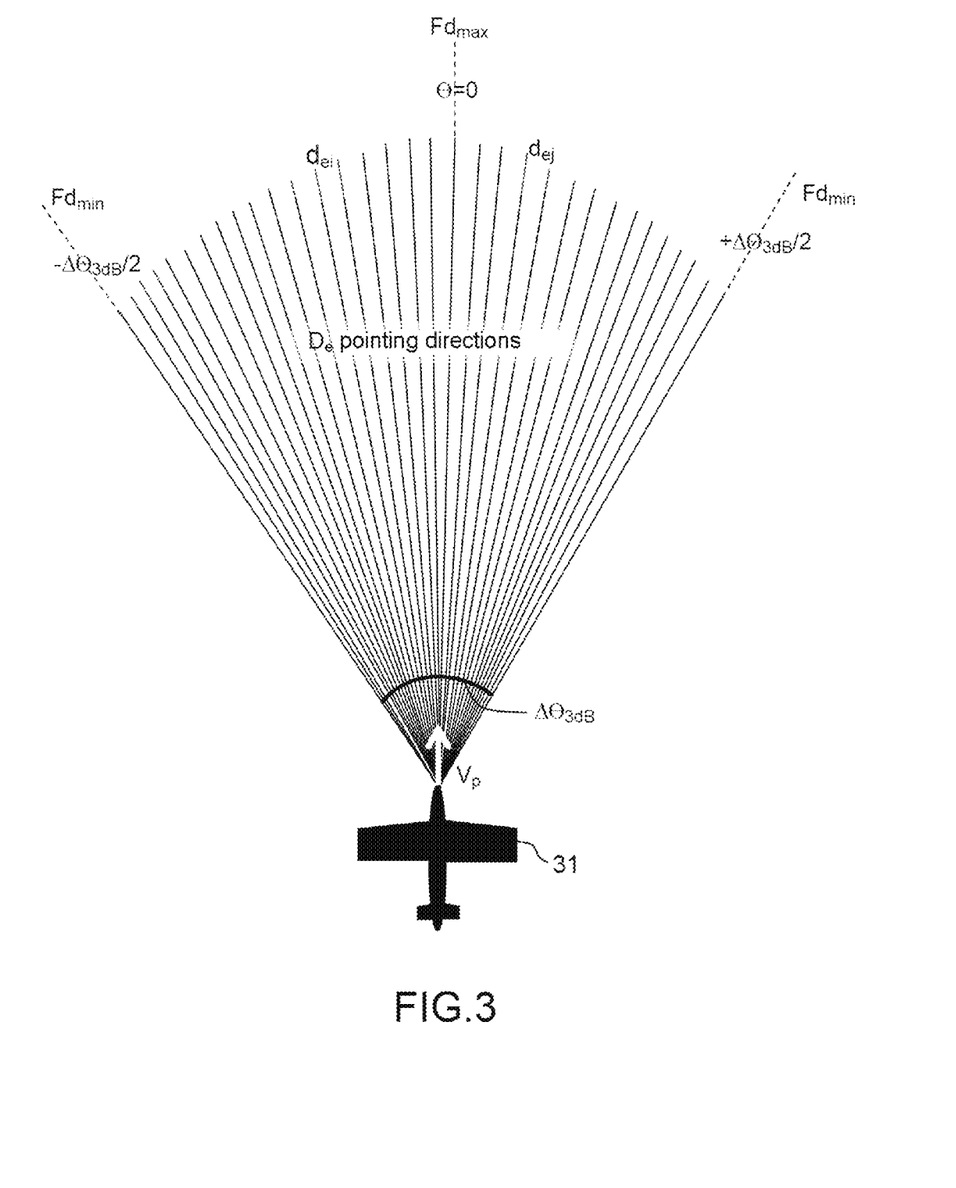
FIG. 3, the different transmission pointing directions in the aperture of a radar with which a carrier is equipped.

FIG. 3 illustrates this situation in the particular case of a radar with circular angular scanning in the horizontal plane, the radar equipping a carrier 31 at the speed Vp. The carrier is for example an aircraft. Assuming that the radar covers all of the angular domain $\Delta\theta_{3\ dB}$ using a number of $D_e$ pointing directions $d_{ei}$ during a time unit of duration T, the coherent integration time available in each direction is then T/De and the resulting doppler analysis resolution is $$\delta F = \frac{D_e}{T}.$$

Thus, a conventional doppler processing by digital Fourier transform produces a number N of adjacent filters of resolution $$\delta F = \frac{D_e}{T},$$

between the frequencies 0 and Fech in which the echoes and the fixed clutter occupy, after spectral aliasing, a frequency band Bd.

FIG. 3 illustrates this situation, showing a radar 31 at speed Vp and the different pointing directions $d_{ei}$ in the antenna aperture angle. This situation is illustrated in the hypothesis of a Fourier transform performed on a complex signal, for the case where all the fixed echoes and clutter are seen approaching in a doppler band whose width is less than the sampling frequency. Each pointing direction $d_{ei}$ corresponds to a different doppler, each doppler being a function of the cosine of the angle of the direction, the doppler being maximum for θ=0, equal to Fdmax=2Vp/λ.

Before spectral aliasing, the doppler frequencies correspond unambiguously to the approach speed and to the angle of arrival of the radar echoes. Because of the spectral aliasing, and without knowledge of the speed of the carrier 31, it is not possible, in the analysis band 0 to Fech, to determine an approach speed as a function of the index of the doppler filter in which an echo or fixed clutter responds. It is also not possible to know, by measuring the aliased doppler frequency, the angular direction of the signals detected.

Figure 4:
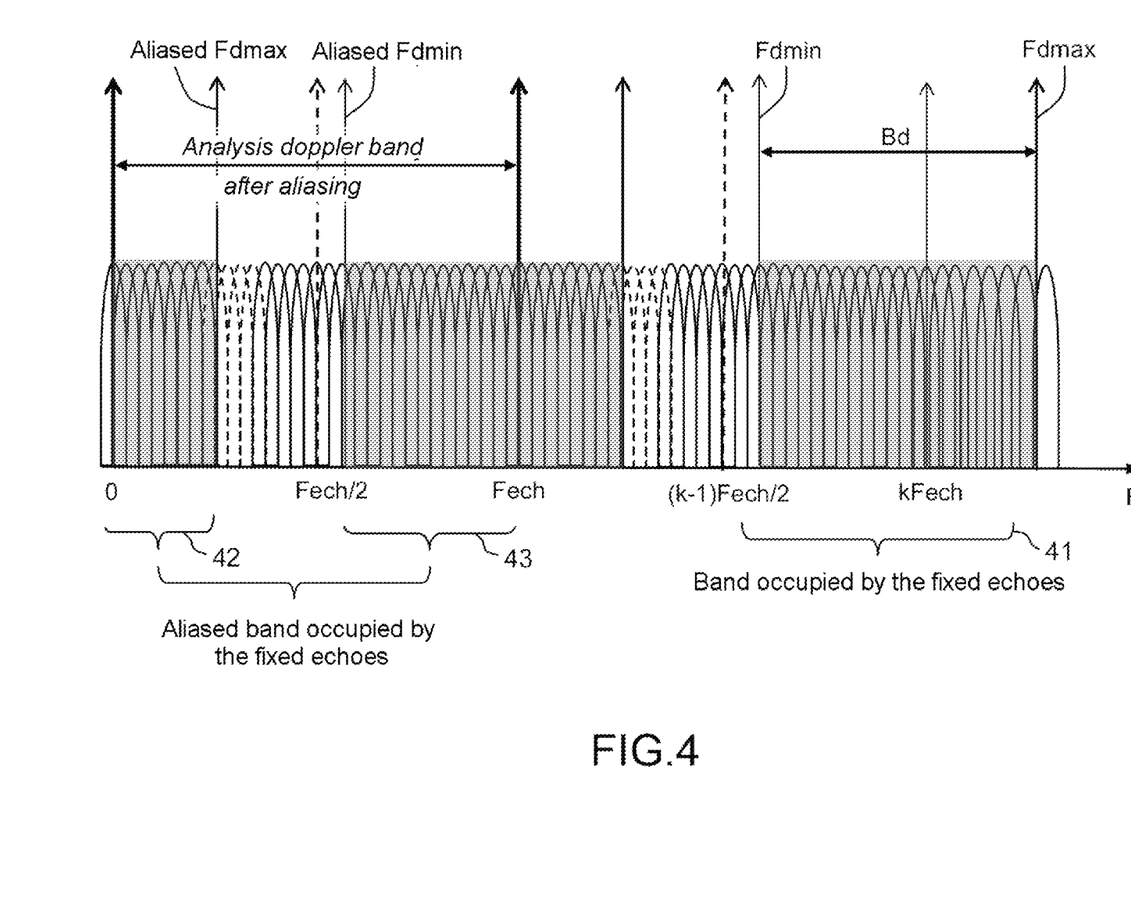
FIG. 4, an illustration of a frequency band occupied by fixed echoes and the corresponding aliased frequency band.

Without precise knowledge of the speed of the carrier and of the line of sight of the antenna of the radar, the doppler band corresponding to the echoes and to the fixed clutter appears, by aliasing between 0 and Fech, in an a priori undetermined position as FIG. 4 illustrates.

FIG. 4 represents more specifically the spectrum of the received echoes, with, on the right, the doppler band Bd, the band 41 occupied by the fixed echoes, lying between Fdmin and Fdmax. On the left, there is the aliased band occupied by the fixed echoes composed of two subbands 42, 43. As is described more particularly hereinbelow, it can be seen that there is no link between Fdmin and Fdmax and what appears aliased (aliased Fdmax and aliased Fdmin).

In some cases, the doppler band occupied by the fixed echoes can be greater than the sampler frequency, so that the echoes originating from different directions are superimposed after aliasing in the doppler filters distributed between 0 and Fech as FIG. 4 shows. There is then no longer a "exo-clutter" doppler zone, all the moving echoes being likely to appear superimposed with the fixed echoes in all the doppler filters.

Assuming that the radar uses bursts of duration T composed of C cycles of P recurrences of duration Tr and performs a number of pointing directions De=P on each cycle, a coherent integration time is obtained in a given direction T with a revisit time Trev=P·Tr.

The sampling frequency is then:

$Fech=1/Trev=1/P\cdot Tr$ Hz;

the doppler analysis resolution is:

$\delta Fd=1/T=1/C\cdot P\cdot Tr$, and the number of doppler filters is N=C.

If the case of an airborne radar operating in millimetric waves, intended for the EVS function, is taken as an example, assuming a carrier speed of Vp=60 m/s, a wavelength λ=4 mm and an antenna aperture at 3 dB in circular mode $\Delta\theta_{3dB}$=350 mrd (20°), then:

$$Fdmax = 2\frac{Vp}{\lambda} = 30 \text{ KHz}$$

$$Fdmin = 2\frac{Vp}{\lambda}\cos\frac{\Delta\Theta_{3dB}}{2} = 29.544 \text{ KHz and}$$

$$Bd = Fdmax - Fdmin = 456 \text{ Hz}$$

By considering T=80 ms, C=16, P=$D_e$=32 and Tr=156 µs, then the following is obtained:

$Fech$=200 Hz and $N$=16.

As FIG. 4 illustrates, the doppler band covered by the fixed echoes Bd occupies, after aliasing, all of the domains 0—Fech totally ambiguously and the measurement of the doppler frequency is impossible. Consequently, a particular doppler filter cannot a priori be associated with a given angular pointing, and it is not possible to estimate the approach speed of the clutter and of the fixed echoes according to their angular positions with respect to the line of sight. To overcome this situation and restore an unambiguous doppler measurement capability, it would be necessary to use different sampling frequencies from burst to burst over time. These sampling frequencies are high, beyond what is possible, given the other constraints regarding the waveform, in particular the instrumented range and the number of pointing directions which are imposed.

Thus, if according to the patent application FR1910613, the radar processing produces, by digital Fourier transform, a spectral breakdown of the received signal of FFT or DFT type on a number N of doppler filters corresponding to the time horizon T, the result is a doppler distance map of dimension Ncd on the distance axis and N on the doppler axis. This map represents the amplitude and the phase of the echoes received for each pointing direction $d_{ei}$ of the radar beam.

To extract the detections corresponding to the fixed echoes and to the coherent clutter, it is then necessary to choose, for each pointing direction, the doppler filter which best represents the signals corresponding to these echoes. This selection can be made on the basis of criteria relying on the energy level received on the distance axis for each doppler filter, for example by searching for the doppler filter containing the spot echoes of highest power, or even by integrating the received power on all the distance cells and by retaining the doppler filter which gives the highest result. However, the choice of the doppler filter made in this way can be disrupted in the presence of echoes of high power originating from directions different from the pointing direction, by detection on the side lobes of the antenna. The selection of the doppler filter based on such criteria is also sensitive to the accidental variations of the pointing axis of the antenna, caused by the spurious movements of the carrier. Moreover, the detection of the moving targets remains possible in all the doppler filters as long as the power of the corresponding echoes is greater than that of the clutter and of the fixed echoes, but their speeds cannot be determined. The above lines therefore show the limits of the solution developed in the patent application FR1910613.

The solution proposed by the invention is based on an active antenna architecture, which can be a conventional active electronically scanned array (AESA) antenna or an antenna of MIMO type, according to the description of the patent application FR1910613. The radar implementing the invention is therefore a radar with active antenna, composed of an array antenna of Ne channels in transmission and Nr channels in reception. In the particular case of an AESA antenna with active modules: Ne=Nr. Each transmission channel (TX) and reception channel (RX) comprises an antenna subarray whose angular aperture corresponds to the overall coverage domain of the radar.

For example, in the general case of a 2D antenna, the aperture in a first plane is denoted $\Delta\theta x$ and in the second plane at right angles to the first plane is denoted $\Delta\theta y$, typically corresponding to the angular aperture in the horizontal plane and in the vertical plane, or circular angle and elevation angle.

In this multichannel transmission and reception antenna architecture, phase-shifting of the transmission channels is used to produce a focusing in a different direction of the space from pulse to pulse, and a digital beam-forming in reception of at least one beam in the focusing direction, for each pulse transmitted. According to the invention, the pointing directions can be sequenced in any order, according to a uniform or non-uniform spatial distribution, in one plane or in two planes.

Figure 5:
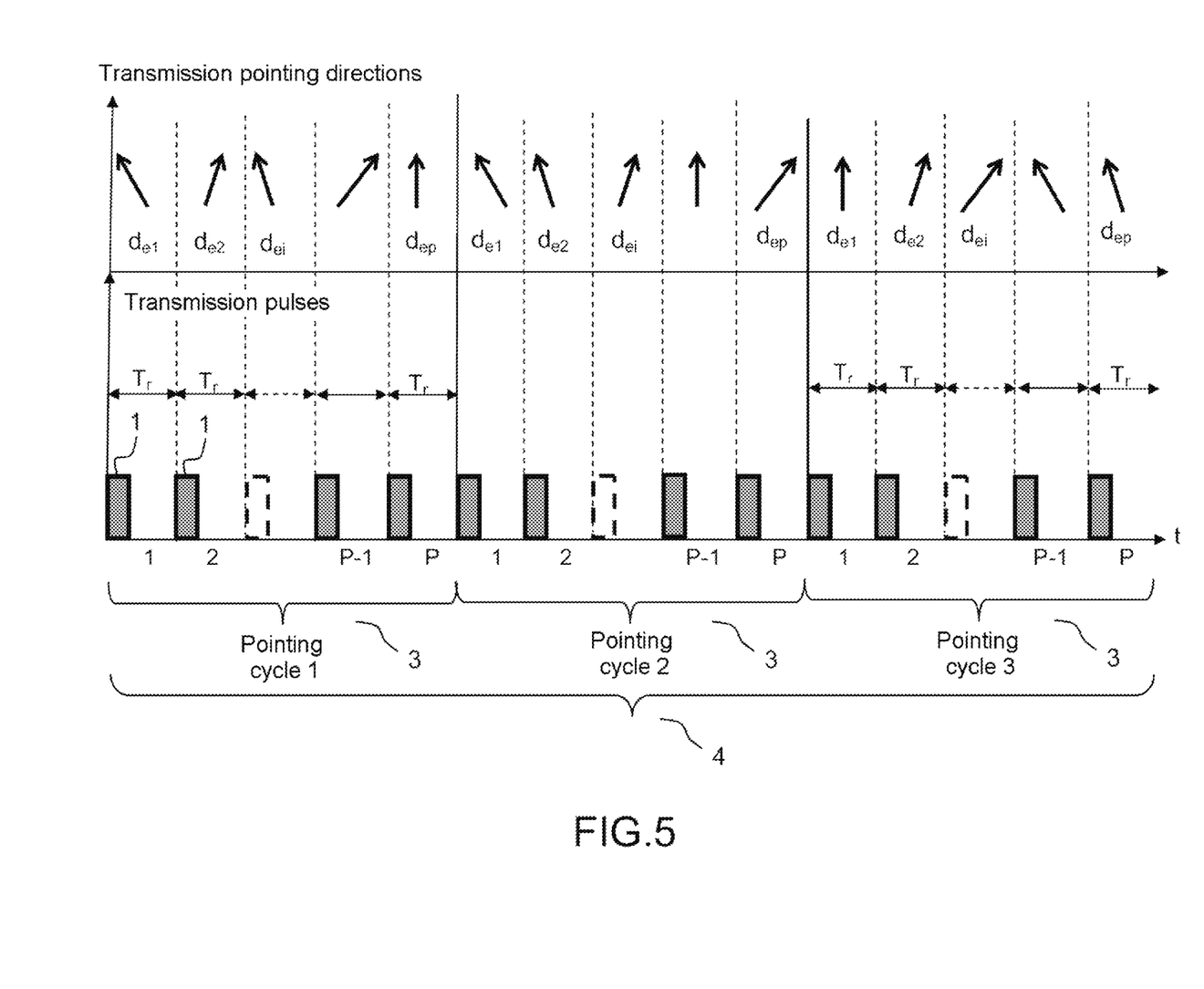
FIG. 5, an illustration of the principle of transmission of a radar according to the invention.

FIG. 5 illustrates the transmission principle implemented in the invention. More particularly, FIG. 5 presents an example of sequencing of the focusing directions on transmission according to the invention, by illustrating a scan in a single plane.

Remember that the transmission of the radar is composed of a succession of bursts that are themselves composed of a number P of successive recurrences. The duration of a burst corresponds to a processing cycle 3 time T necessary to cover the detection domain of the radar. The same references as in FIG. 1 corresponding to the same elements are used again in FIG. 5. The transmission can be pulsed, continuous or quasi-continuous, for example in the case of an FMCW radar.

As in FIG. 1, the principle of a focusing in a direction of the space from pulse to pulse 1 is shown, but in a different way. Unlike in FIG. 1 where the focusing directions change according to an established order from one pulse to another (this pulse-to-pulse order being reproduced from one cycle to another, a pulse i having the same focusing direction from one cycle to another), in FIG. 5, the directions change randomly from one pulse to another (a pulse i no longer having the same focusing direction from one cycle to another).

The solution proposed by the invention therefore consists in modifying, according to a pseudo random code, the order of the pointing directions of the beam between the successive pointing cycles of a same doppler burst so as to obtain an irregular sampling of the signal in the doppler domain. This method makes it possible to implement, from the received radar signals, a particular correlator making it possible to estimate the doppler frequency of the targets unambiguously.

Advantageously, a correlator is produced in reception that is suited to this irregular sampling to estimate the doppler frequency of the detected targets unambiguously.

This correlator produces, for each distance cell, $N_{Fd}$ doppler filters corresponding to $N_{Fd}$ different hypotheses of the doppler frequency. For each pointing direction, the doppler filter retained corresponds to $N_{Fd}$ doppler frequency hypotheses having produced a maximum of the correlation function.

This method advantageously makes it possible to automatically isolate, for each pointing direction, the signals corresponding to the fixed echoes and clutter for which the doppler frequency corresponds to that pointing direction. That avoids the difficult step of selection of one FFT filter out of the N possible filters, without the capacity for unambiguous estimation of the doppler frequency. It also makes it possible, when the contrast with respect to the clutter is sufficient, to estimate the relative speed of moving targets without ambiguity. The following description specifies this method and these advantages in more detail.

We return therefore to FIG. 5. The domain to be covered by the radar is first of all broken down into a certain number of pointing directions De in transmission, according to a beam resolution of the order of $\lambda/Le$ on the axis Ox and $\lambda/He$ on the axis Oy. The transmission of the radar is controlled so as to successively radiate in the De pointing directions $d_{ei}$, by changing direction from pulse to pulse, that is to say from recurrence to recurrence, during a number C of successive pointing cycles 3 each comprising P recurrences of duration Tr, these successive pointing cycles radiating in the same De directions according to a different and pseudo random order on each cycle. In other words, there is a set of De pointing directions and they are distributed pseudo-randomly in the recurrences of each cycle. The set of these cycles constitutes a detection block 4 of duration T, corresponding to a burst of R=C×P recurrences.

The pointing of the antenna can be performed in one plane or in two planes. The means for controlling the pointing direction of the beam by phase-shifting of the transmission channels are well known to the person skilled in the art.

In reception, the radar processing performs, on each recurrence of duration Tr, the forming of at least one beam in the direction of transmission. This operation can be performed in analogue mode by summing of the reception channels after phase-shifting, or, preferentially, digitally, after analogue/digital decoding according to the known methods. In this latter case, the forming of the beam occurs before or after suitable processing and separation of the received signals on the distance axis. In all the cases, the forming of the beam in reception is performed on each recurrence, that is to say before integration processing over the duration T of a burst, corresponding to C×P recurrences.

The forming of the beam can be performed on all the receivers in a single operation, or by dividing the antenna into different quadrants each composed of a portion of the reception channels, for example when there is a wish to perform a single-pulse angle error measurement processing. After beam-forming in reception and suitable filtering on the distance axis, the received signal is broken down according to a certain number Ned of distance cells covering the instrumented range of the radar.

A coherent integration processing is then applied to the doppler axis for each distance over the duration of the burst, for each of the transmission and reception pointing directions. This processing consists in applying a correlator to the received signal, according to different doppler frequency hypotheses. After distance processing, the first step is the sampling of the received signal in each transmission pointing direction, using the irregular sampling comb implemented in transmission. There is thus obtained, for each distance cell and for each direction targeted, a series of samples taken at the instants ti,j, the index i corresponding to the pointing direction and the index j corresponding to the cycle of order j in the doppler burst.

A frequency domain $D_{FD}$ is then defined that corresponds to the domain of the relative speeds between the carrier and the targets to be considered, and of the wavelength $\lambda$ of the radar. Typically, this domain can be written:

$$D_{FD}=2(Vr_{max}-Vr_{min})/\lambda=Fd_{max}-Fd_{min}$$

in which:
$Vr_{max}$ and $Vr_{min}$ are, respectively, the maximum and minimum relative speeds between the carrier of the radar and the set of the targets to be considered;
$Fd_{max}$ and $Fd_{min}$ are the bounds of the doppler domain to be explored.

Also defined is a discretization pitch of the correlator $\Delta Fd$, corresponding to the doppler frequency interval between two successive frequency pitches of indices k and k+1, corresponding to the doppler frequencies $Fd_k$ and $Fd_{k+1}$ such that:

$$\Delta Fd=Fd_{k+1}-Fd_k$$

Advantageously for a burst duration of duration T, the pitch of the correlator $\Delta Fd$ is chosen to be less than or equal to the analysis resolution corresponding to the frequency $\delta Fd=1/T$. The correlation is then performed for all the values of k lying between 0 and $M-1=(D_{FD}/\Delta Fd)-1$ by performing the correlation operation:

$$Cor_{j,k} = \sum_{i=1}^{De} S_{i,j}\exp^{-j\frac{2\pi(Fd_{min}+k\Delta Fd)t_{i,j}}{M}}$$

The correlation operation thus performed is similar to a DFT or to an FFT over the C×P recurrences of a burst in which the samples of the signal taken at the multiple instants of the recurrence are nil, except at the instants $t_{i,j}$. The implementation of the correlator can thus be performed by an optimized processing of FFT type over C×P points, or by an operation of conventional linear filtering type over C points, according to requirements and possibilities for optimization of the computation time. It is also possible to apply a weighting window before the correlation operation so as to reduce the level of the correlation side lobes. Finally, it is also possible, according to the known methods, to perform the correlation not in the time domain but in the spectral domain. After the doppler correlation processing, there is, in each pointing direction, a distance/doppler matrix comprising Ncd distance cells in the first dimension and M doppler cells in the second dimension.

The production of the "raw" radar image is now described. The radar image is intended to display, on the one hand the outlines of homogeneous clutter and, on the other hand, the position of the fixed and/or mobile spot targets in the observation domain of the radar. It corresponds to the representation of the amplitude of the received signals as a function of the distance and of the pointing angle. To produce this image, there is extracted from the doppler distance matrix, for each pointing direction, the vector corresponding to the amplitude and to the phase of the received signals on the distance axis, for the doppler cell corresponding to the maximum energy estimated on the clutter. The selection of this doppler cell is performed based on a measurement of the average energy received on the distance axis for each frequency cell of the correlator. This measurement consists in summing in amplitude the received signals for which the amplitude is greater than a predetermined threshold over all of the distance cells, for each frequency cell, and in normalizing the result obtained.

The frequency cell corresponding to the maximum amplitude after summing and normalization is retained as the one corresponding to the doppler frequency relative to the clutter in the direction concerned. Preferentially, the summing of the amplitude on the distance axis is performed by excluding the distance cells corresponding to local maxima of high energy which cannot be likened to an environment of homogeneous clutter. It is also possible to weight the signal in amplitude in the different distance cells before summing to compensate for the attenuation of the received signal as a function of the distance.

At the end of this step, each vector obtained is identified by a pointing direction and an unambiguous relative clutter speed. The different vectors corresponding to the different pointing directions are then concatenated to form a new distance/pointing angle matrix corresponding to all of the imaged domain delimited by the angular sector $\Delta\theta_{3\,dB}$ (see FIG. 3). The result can be typically presented according to a polar view of PPI type.

The production of the radar image enriched by the detection of the spot targets is now described. The raw image obtained previously can in fact be enriched through the detection and the estimation of the relative speed of the spot targets. To estimate the speed of the spot targets, the signals corresponding to local maxima for which the amplitude is greater than a predetermined threshold are detected in each doppler distance matrix according to the conventional radar extraction methods known to the person skilled in the art.

The index of the distance and doppler cells in which the maxima have been detected makes it possible to estimate the distance and the speed of the corresponding targets. The measurement can be refined if need be by using contrast analyses between the signal levels detected in the distance and doppler cells adjacent to the distance/doppler cell that has given the signal maximum according to methods that are also well known.

At the end of this processing in each pointing direction, each of the targets detected is characterized by an amplitude, an angular position and an unambiguous speed. These detections are used to enrich the raw radar image by adding to it a synthetic marking corresponding to the position, to the amplitude and to the speed of the targets detected. In the case where a single image of the fixed echoes is sought, the detections corresponding to an approach speed different from that estimated for the clutter in the same angular direction can be eliminated. Conversely, it is possible to display only the moving targets by rejecting for each direction targeted, all the detections corresponding to the clutter speed in that same direction.

Figure 6:
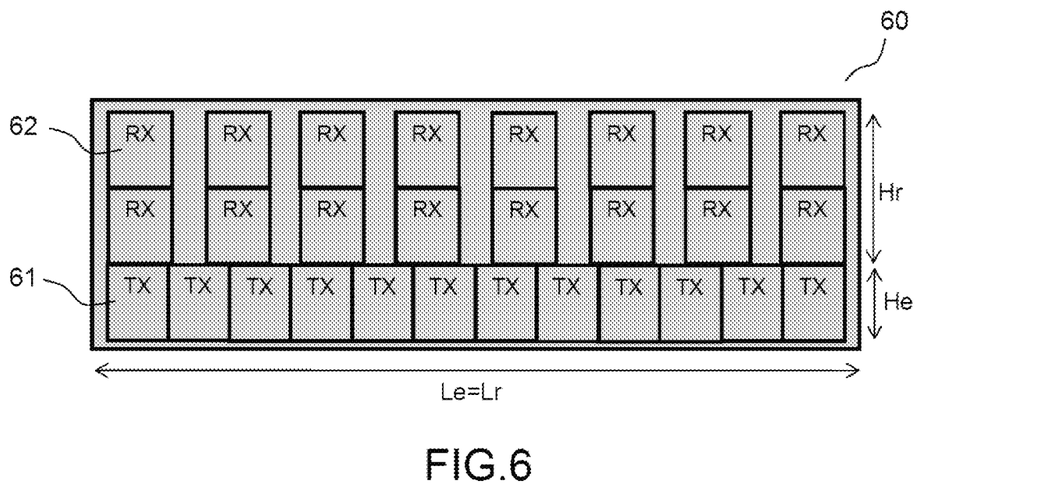
FIG. 6, an example of an antenna array used for the implementation of the invention.

An exemplary embodiment is now described in light of FIG. 6. The case of an airborne radar operating in millimetric waves, intended for the EVS function, is used again as example. This radar comprises a number of transmission channels Ne and a number of reception channels Nr, the transmission and reception antennas being all identical, of wavelength Δθx on the horizontal axis Ox and of wavelength Δθy on the vertical axis Oy. In the example of FIG. 6, the antenna comprises Ne=12 transmission subarrays 61, in a row of length Le and of height He, and Nr=16 reception subarrays 62, distributed in two identical rows over a length Lr occupying a height Hr. These subarrays are distributed over a total length L=Le=Lr on the axis Ox and a height H=He+Hr on the axis Oy, with Hr=2 He as FIG. 6 illustrates. The length L is for example equal to 50 cm.

Constituted thus, after focusing, the antenna array 60 has an angular resolution in transmission and in reception substantially equal to λ/L=8 mrd, i.e. 0.45° in the circular plane, for the example of the figure.

In an exemplary application, the aim is to perform a scan in transmission in the circular plane using P=32 beams substantially evenly distributed in the angular aperture Δθ$_3$ $_{dB}$. The pitch between two adjacent beams is then 4.7 mrd, i.e. 0.27°. The repetition period of the radar is equal to Tr=130 μs and the duration of a burst is set at T=66.5 ms, this burst comprising C=16 pointing cycles each comprising P=32 recurrences. Also assumed is a speed on the descent axis of the carrier Vp=60 m/s, a wavelength λ=4 mm and an aperture of each antenna subarray 61, 62 at −3 dB in circular mode equal to Δθ$_3$ $_{dB}$=146 mrd (8.3°).

From these different parameters, for this example, the following are deduced:

$$Fdmax = 2\frac{Vp}{\lambda} = 30 \text{ KHz}$$

$$Fdmin = 2\frac{Vp}{\lambda}\cos\frac{\Delta\Theta_{3dB}}{2} = 29.920 \text{ KHz and}$$

$$Bd = Fdmax - Fdmin = 80 \text{ Hz}$$

$$\delta F = \frac{1}{T} = 15 \text{ Hz}$$

If we take the case of the patent application FR1910613, with pointing cycles that are all identical in D$_e$=P=32 different directions, a revisit time in a given direction Trev=P·Tr=4.2 ms is obtained, corresponding to a sampling frequency Fech=1/Trev=240 Hz.

Figure 7:
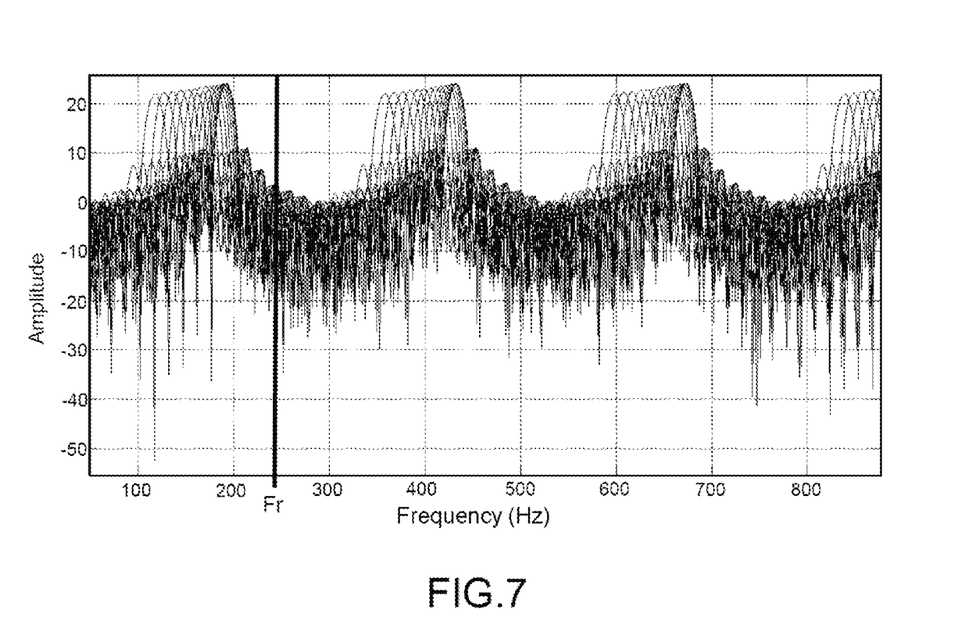
FIG. 7, amplitudes obtained at the DFT of FFT processing output for different pointing directions by a method according to the prior art.

On reception, a digital Fourier transform processing gives, for example for the first sixteen pointing directions, i.e. between −4.2° and −0.13° a ground clutter spectrum that is ambiguity-aliased between 0 and Fr=240 Hz in accordance with FIG. 7, the latter representing the DFT or FFT output amplitude (given in dB as a function of frequency) for the different pointing directions. A regular frequency spectrum is obtained here without ambiguity being eliminated.

A case of application according to the invention is now taken. Instead of performing C=16 identical successive pointing cycles, the order of the pointings is modified from one cycle to another, as FIG. 5 illustrates. For example, by performing, for each cycle, a random draw that is uniformly distributed on the order of the pointings, a pointing matrix is obtained that corresponds to table 1 below (shown in two parts: columns 1 to 16 and columns 17 to 32). Each row represents the successive indices of the 32 pointing directions performed during a same cycle, these pointing directions being modified on each recurrence. For example, the index 31 in the second column of the third row means that the direction of index 31 (d$_{e31}$) is applied to the second recurrence of the third cycle, whereas this same direction d$_{e31}$ is applied to the first recurrence of the sixth cycle (row 6, column 1).

Columns 1 to 16:

| 2 | 22 | 25 | 24 | 29 | 30 | 17 | 1 | 12 | 11 | 21 | 10 | 28 | 9 | 31 | 19 |
|---|----|----|----|----|----|----|---|----|----|----|----|----|---|----|----|
| 4 | 28 | 10 | 24 | 27 | 17 | 14 | 29 | 20 | 8 | 18 | 21 | 5 | 1 | 3 | 2 |
| 10 | 31 | 24 | 26 | 29 | 22 | 27 | 16 | 23 | 7 | 13 | 14 | 6 | 28 | 21 | 15 |
| 7 | 16 | 9 | 20 | 3 | 17 | 19 | 13 | 18 | 25 | 8 | 26 | 28 | 1 | 24 | 27 |
| 28 | 21 | 1 | 15 | 27 | 17 | 10 | 24 | 26 | 16 | 7 | 4 | 32 | 8 | 14 | 29 |
| 31 | 20 | 10 | 29 | 1 | 19 | 28 | 32 | 13 | 27 | 14 | 22 | 8 | 2 | 16 | 18 |
| 30 | 7 | 23 | 29 | 24 | 13 | 2 | 11 | 12 | 15 | 25 | 9 | 16 | 19 | 21 | 18 |
| 3 | 4 | 14 | 17 | 10 | 22 | 9 | 28 | 24 | 8 | 15 | 12 | 7 | 27 | 13 | 23 |
| 12 | 9 | 18 | 24 | 30 | 31 | 5 | 6 | 25 | 3 | 8 | 17 | 1 | 10 | 28 | 27 |
| 30 | 21 | 4 | 11 | 19 | 22 | 6 | 29 | 8 | 25 | 24 | 32 | 17 | 2 | 27 | 26 |
| 3 | 30 | 11 | 14 | 1 | 2 | 26 | 17 | 8 | 22 | 27 | 13 | 24 | 12 | 16 | 20 |
| 19 | 2 | 12 | 32 | 1 | 27 | 18 | 31 | 4 | 5 | 25 | 23 | 13 | 21 | 14 | 15 |
| 12 | 5 | 29 | 17 | 21 | 30 | 14 | 15 | 1 | 13 | 2 | 20 | 7 | 26 | 32 | 16 |
| 9 | 1 | 3 | 18 | 22 | 31 | 5 | 13 | 8 | 19 | 23 | 27 | 32 | 24 | 25 | 6 |
| 25 | 26 | 2 | 6 | 29 | 14 | 5 | 1 | 31 | 18 | 13 | 8 | 19 | 32 | 10 | 23 |
| 20 | 3 | 12 | 6 | 32 | 24 | 2 | 9 | 21 | 19 | 26 | 18 | 16 | 28 | 22 | 7 |

Columns 17 to 32:

| 13 | 4 | 18 | 20 | 15 | 3 | 8 | 5 | 26 | 23 | 6 | 16 | 27 | 7 | 14 | 32 |
|----|---|----|----|----|---|---|---|----|----|---|----|----|---|----|----|
| 9 | 32 | 22 | 19 | 30 | 11 | 7 | 12 | 15 | 23 | 6 | 26 | 25 | 13 | 31 | 16 |
| 2 | 17 | 30 | 5 | 32 | 18 | 12 | 19 | 8 | 20 | 3 | 9 | 25 | 4 | 1 | 11 |
| 12 | 14 | 32 | 6 | 4 | 29 | 11 | 21 | 10 | 30 | 5 | 15 | 2 | 22 | 23 | 31 |
| 30 | 6 | 25 | 19 | 31 | 23 | 20 | 2 | 3 | 9 | 22 | 11 | 18 | 5 | 13 | 12 |
| 24 | 7 | 30 | 9 | 5 | 12 | 4 | 11 | 23 | 15 | 17 | 26 | 6 | 3 | 21 | 25 |

-continued

| 14 | 32 | 20 | 10 | 27 | 22 | 8  | 28 | 1  | 5  | 4  | 31 | 17 | 6  | 26 | 3  |
|----|----|----|----|----|----|----|----|----|----|----|----|----|----|----|----|
| 31 | 6  | 1  | 26 | 25 | 5  | 30 | 20 | 16 | 2  | 32 | 18 | 21 | 29 | 11 | 19 |
| 14 | 11 | 20 | 7  | 13 | 22 | 32 | 16 | 19 | 21 | 15 | 29 | 23 | 2  | 4  | 26 |
| 7  | 20 | 3  | 10 | 18 | 13 | 1  | 5  | 28 | 12 | 15 | 23 | 31 | 9  | 16 | 14 |
| 28 | 29 | 15 | 4  | 7  | 9  | 21 | 18 | 5  | 19 | 10 | 25 | 32 | 23 | 6  | 31 |
| 29 | 26 | 6  | 7  | 11 | 17 | 20 | 30 | 8  | 24 | 16 | 9  | 22 | 10 | 3  | 28 |
| 24 | 10 | 18 | 23 | 19 | 27 | 25 | 3  | 6  | 28 | 4  | 8  | 9  | 31 | 11 | 22 |
| 29 | 28 | 21 | 2  | 16 | 10 | 30 | 14 | 15 | 7  | 26 | 20 | 4  | 11 | 17 | 12 |
| 3  | 16 | 30 | 28 | 5  | 11 | 24 | 22 | 9  | 27 | 4  | 17 | 21 | 12 | 7  | 20 |
| 15 | 13 | 30 | 5  | 10 | 23 | 14 | 11 | 4  | 31 | 8  | 17 | 29 | 1  | 27 | 25 |

To take the first pointing direction ($d_{e1}$) of index 1, it appears on the eighth recurrence of the first cycle (row 1, column 8), on the fourteenth recurrence of the second cycle (row 2, column 14) and so on. In other words, this direction del is applied at the times 8 Tr, 46 Tr, 95 Tr, 110 Tr, 131 Tr, 165 Tr, 217 Tr, 243 Tr, 269 Tr, 311 Tr, 325 Tr, 357 Tr, 393 Tr, 418 Tr, 456 Tr, 510 Tr. Referring to the example of the first pointing direction ($d_{e1}$) which appears pseudo-randomly from one recurrence to another, an irregular time interval is created between two pointings in the same direction as the above application times show.

Figure 8:
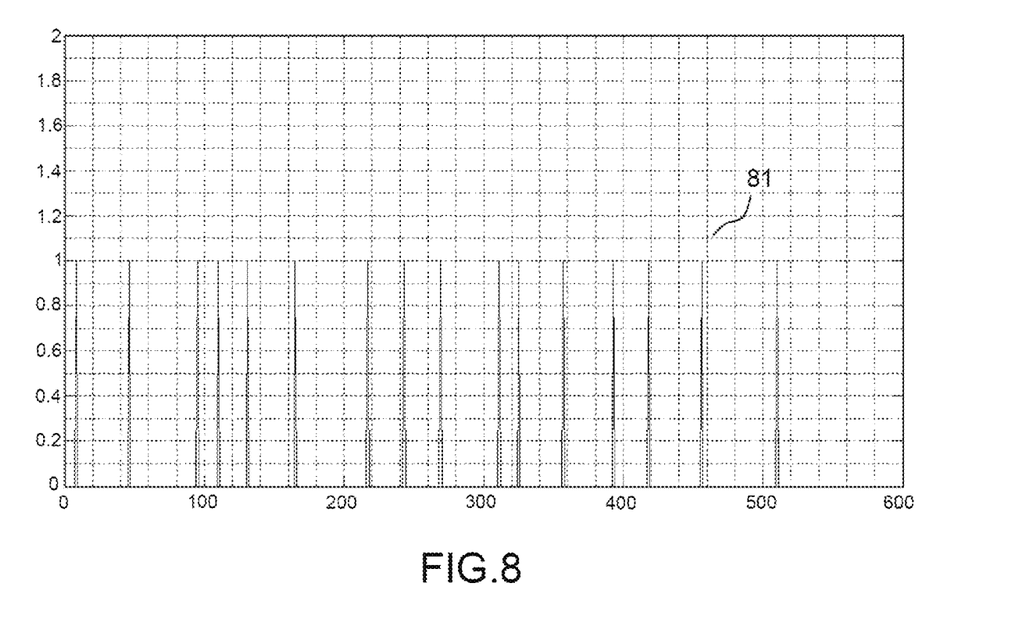
FIG. 8, an example of a temporal sampling comb obtained according to the invention.

By proceeding in this way, for a given pointing direction, the time interval between two samples varies irregularly and pseudo-randomly. Advantageously, the time sampling comb 81 obtained is, here, irregular as illustrated by FIG. 8 which shows, by way of example, the pointing comb of the direction of index 1 ($d_{e1}$). This figure presents the correlation peaks as a function of the recurrences. There are peaks at the times indicated above (8 Tr, 46 Tr . . . 510 Tr).

For each direction, a different pointing comb is obtained, leading to a different correlation result for each direction.

On reception, for each direction, a correlator is produced on the doppler frequency by considering, for example, the domain of the possible speeds of the fixed echoes and of the clutter lying between 55 m/s and 65 m/s, given the nominal descent speed, equal to 60 m/s (case of landing of an aircraft for example). Preferentially, the pitch of the correlator in frequency $\Delta Fd$ is chosen to be lower than the analysis resolution, set by $\delta Fd=1/T$, i.e. $\delta Fd=15$ Hz, which makes it possible to refine the measurement of the position of the correlation maximum.

Figure 9A:
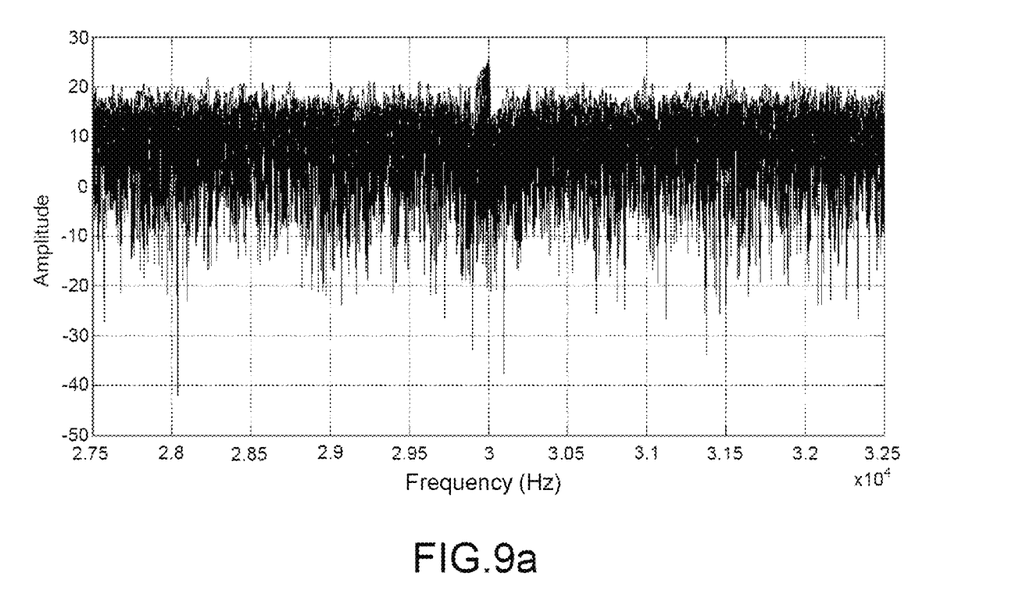
FIG. 9a, an illustration of the output amplitude of a correlator for different pointing directions.
Figure 9B:
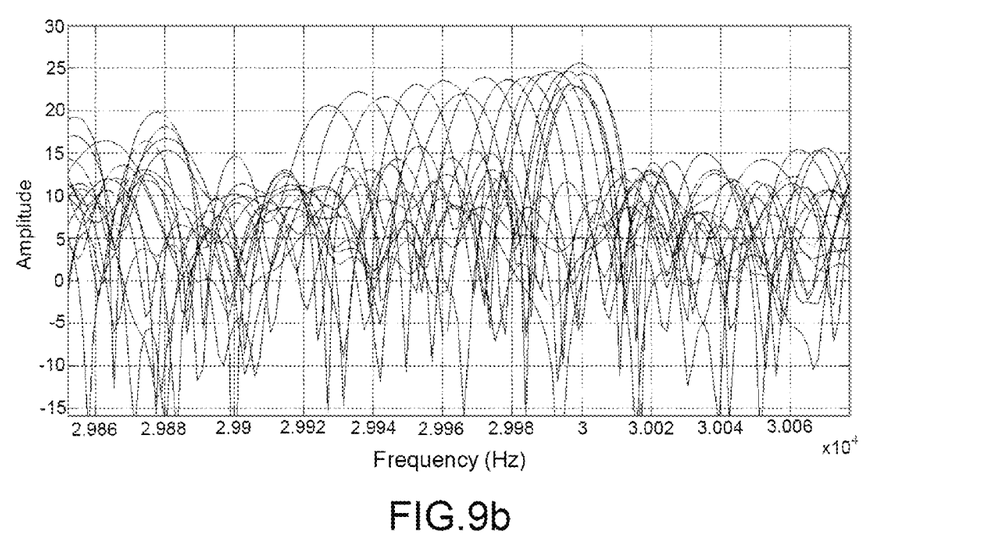

A pitch of 1.5 Hz is for example chosen, corresponding to a speed pitch of 3 mm/s. After correlation, the spectral analysis for the first sixteen pointing directions corresponds to the curves of FIGS. 9a and 9b which represent the amplitude of the correlator for the different pointing directions, FIG. 9b being a zoom on the detection maxima. According to what has been described previously, the estimation of the speed of the clutter in a pointing direction is obtained by integrating the energy on the distance cells relative to this direction for each doppler cell of the correlator, then in searching for the doppler cell in which the total energy is maximum, the maxima being notably illustrated by FIG. 9b.

Figure 10:
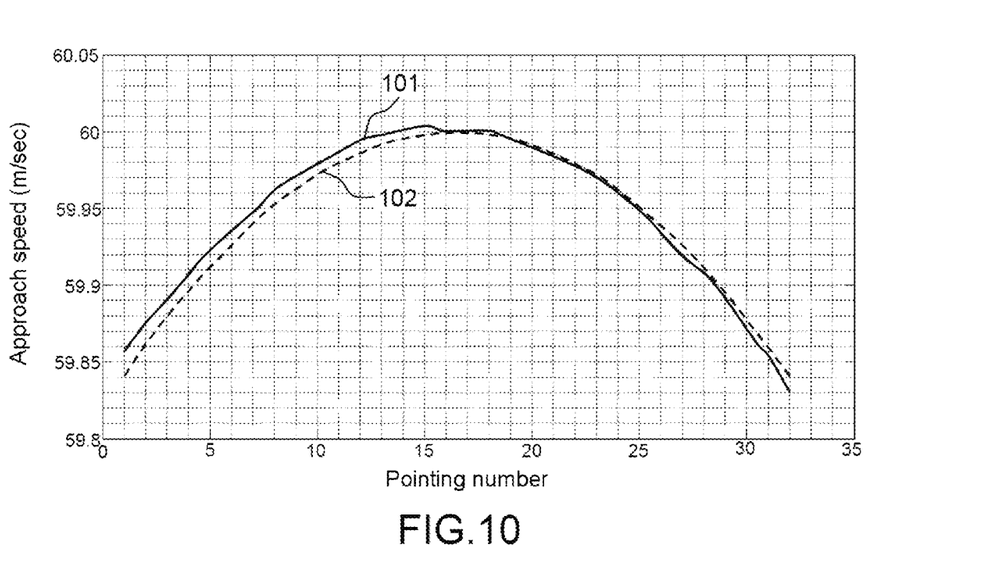
FIG. 10, an illustration of the estimated clutter speed and of the real speed as a function of the pointing directions.

Conventionally, it is then possible, by searching for the correlation maximum in each pointing direction, to determine the relative speed of the clutter and of the ground echoes. The result of this estimation is presented in FIG. 10. FIG. 10 more particularly represents the estimated speed (by a first curve 101) and the real speed (by a second curve 102) at the center of the beam for each pointing direction. In this FIG. 10, the y axis represents the speed in meters per second (m/s), for example the approach speed of an aircraft in landing phase. The x axis represents the 32 pointing directions.

Advantageously, the capacity to extract by doppler the radial speed of the detected targets makes it possible to consider additional functions that can notably reinforce the functionalities and the performance of the tracking radar, in particular on a moving carrier:
- separation of moving targets from the ground clutter and from the fixed echoes;
- possible tracking of the targets by predictive filter;
- angular separation of the fixed echoes and of the coherent ground clutter according to their angular direction by doppler filtering;
- in the case of an aircraft in descent phase, determination of the speed vector of the carrier with respect to the ground and of the point of impact targeted on the ground, or touchdown point;
- navigation realignment, hybridation with onboard inertial data.

Another advantage of the invention is to limit the risks of interference with other radars or communication equipment operating in the same frequency band. In fact, since the directions of the antenna are not performed periodically, the likelihood of reciprocal irradiation by temporal coincidence between equipment is reduced.

The invention claimed is:

1. An imaging method using a doppler radar using an active antenna comprising N transmission channels and M reception channels, said antenna covering an angular domain of given solid angle during a detection time interval of duration T, said time unit corresponding to a detection block wherein the N transmission channels are focused successively in pointing directions ($d_{ei}$) taken from a set of $D_e$ pointing directions, wherein
   the pointing direction on transmission ($d_{ei}$) is modified from recurrence to recurrence;
   each detection block of duration T comprises a periodic repetition of a number C of pointing cycles on transmission, each of these cycles comprising a number P of recurrences, the set of these P recurrences covering the $D_e$ pointing directions ($d_{ei}$) of said set;
   the order of the pointings is modified in a pseudo-random manner from pointing cycle to pointing cycle during a same detection block on transmission so as to create an irregular time interval between two pointings in a same direction;
   at least one beam is formed in reception on each recurrence in a direction included in said focused angular domain in transmission in the pointing direction corresponding to said recurrence.

2. The method as claimed in claim 1, wherein in reception, a coherent doppler processing is performed by applying, in each pointing direction ($d_{ei}$), to all of the sampled received signals, a correlator in the doppler domain, this correlator being matched to an irregular time sampling comb corresponding to the pointing instants on transmission in a same direction.

3. The method as claimed in claim 2, wherein the domain of application of said correlator corresponds to the domain of the relative speeds expected between the carrier of said radar and of the targets to be detected.

4. The method as claimed in claim 2, wherein said correlator is used to eliminate the doppler ambiguities.

5. The method as claimed in claim 2, wherein said correlator is produced by linear filtering in the time domain.

6. The method as claimed in claim 2, wherein said correlator is produced by digital Fourier transform in the time domain.

7. The method as claimed in claim 2, wherein said correlator is produced by digital Fourier transform in the frequency domain.

8. The method as claimed in claim 2, wherein said correlator is used to estimate the relative speed of fixed clutter and echoes in each pointing direction, without external means for measuring the carrier speed.

9. The method as claimed in claim 8, wherein the estimation of the speed of the fixed clutter in a given direction is obtained by integrating the energy on the distance cells relative to this direction for each doppler cell of said correlator, then in searching for the doppler cell in which the total energy is maximum.

10. The method as claimed in claim 9, wherein said estimation of the speed of the fixed clutter is obtained by excluding the spot echoes having an echo level that exceeds a threshold.

11. The method as claimed in claim 2, wherein said correlator is used to eliminate, in each pointing direction, fixed echoes and clutter for which the direction of arrival is different from the pointing direction.

12. The method as claimed in claim 2, wherein said correlator is used to estimate the relative speed of the moving targets in each pointing direction.

13. The method as claimed in claim 2, wherein said correlator is applied piecewise by breaking down the antenna into different quadrants.

14. The method as claimed in claim 1, wherein there is established, for each beam formed in transmission and in reception, a two-dimensional map representing fixed echoes received on the distance axes for all the transmission and reception pointing values.

15. A doppler radar, capable of implementing the method as claimed in claim 1.

16. The doppler radar as claimed in claim 15, wherein of FMCW type.

* * * * *